United States Patent
Tazaki (12)

(10) Patent No.: US 6,199,596 B1
(45) Date of Patent: Mar. 13, 2001

(54) LET-OFF WARP BEAM COUPLING DEVICE

(75) Inventor: Masahiro Tazaki, Kanazawa (JP)

(73) Assignee: Tsudakoma Kogyo Kabushiki Kaisha, Kanazawa (JP)

( * ) Notice: Subject to any disclaimer, the term of this patent is extended or adjusted under 35 U.S.C. 154(b) by 0 days.

(21) Appl. No.: 09/549,923

(22) Filed: Apr. 14, 2000

(30) Foreign Application Priority Data

May 31, 1999 (JP) ................................. 11-152738

(51) Int. Cl.[7] ............................................... D03D 49/10
(52) U.S. Cl. ..................... 139/100; 197/69.83; 197/114 T
(58) Field of Search .................... 192/69.83, 114 T; 139/100

(56) References Cited

U.S. PATENT DOCUMENTS

| | | | |
|---|---|---|---|
| 2,405,698 | * | 8/1946 | Jameson ............................. 192/69.8 |
| 3,915,198 | * | 10/1975 | Svaty et al. ........................ 139/101 |
| 6,015,034 | * | 1/2000 | Rupflin .............................. 139/100 |

* cited by examiner

*Primary Examiner*—Andy Falik
(74) *Attorney, Agent, or Firm*—Frishauf, Holtz, Goodman, Langer & Chick, P.C.

(57) ABSTRACT

The let-off warp beam coupling device has a let-off warp beam rotatably and detachably mounted on a specified position of a weaving machine and a beam gear provided on the weaving machine so as to be opposite to a shaft end of a beam shaft of the let-off warp beam for rotating the let-off warp beam. A driven coupling member is provided so as to be secured at the shaft end of the beam shaft of the let-off warp beam, and has a plurality of projections provided on a circle positioned on a plane perpendicular to the axial direction of the beam shaft. Each projection projects in the axial direction of the beam shaft and has a side face tapered in the axial direction. A driving coupling member is also provided on the beam gear side so as to be opposite to the driven coupling member with a specified spacing therebetween. It has a plurality of projections provided on a circle positioned on a plane perpendicular to the axial direction of the beam shaft.

2 Claims, 6 Drawing Sheets

(PRIOR ART)

(PRIOR ART)

LET-OFF WARP BEAM COUPLING DEVICE

BACKGROUND OF THE INVENTION

The present invention relates to a let-off warp beam coupling device used when a let-off warp beam is coupled to or uncoupled from a weaving machine for coupling and uncoupling an end of a rotating shaft of the let-off warp beam and a beam gear. The beam gear is positioned on the weaving machine side and provided movably in the axial direction of the beam gear.

An example of a conventional let-off warp beam coupling device for coupling and uncoupling a shaft-end of a let-off warp beam and a beam gear on the side of a weaving machine is as shown in FIG. 1. In the device, on a surface around one end of a beam shaft 2 of a let-off warp beam 1, there was formed a spline portion 3, to which a beam gear 4 was fitted in coaxial. The beam gear 4 is provided on the side of the weaving machine for driving the let-off warp beam 1 through the beam shaft 2 and has a fitting bore 5 at the center with grooves 4a formed inside so as to be fitted to the spline portion 3. The beam gear 4 is provided so as to be movable backward and forward with respect to the end of the beam shaft 2 of the let-off warp beam 1 by a back and forth driving mechanism 6. This allows the grooves 4a of the fitting bore 5 of the beam gear 4 to be engaged and disengaged with the spline portion 3.

There was also another type of the let-off warp beam coupling device as shown in FIG. 2. The device is provided with a clutch 8 comprising a channel 6 provided at an end surface of the beam shaft 2 of the let-off warp beam 1 and a protruded strip 7 provided so as to be freely fitted to the channel 6. The protruded strip 7 of the clutch 8 is provided integrally with the beam gear 4 on the side of a weaving machine with its center on the axis of the beam gear 4. It is movable together with the beam gear 4 backward and forward with respect to the beam shaft 2 by the back and forth driving mechanism 6.

In each of the conventional devices, there were problems such as misalignment of the axis of the beam shaft 2 of the let-off warp beam 1 with the axis of the beam gear 4 or the back and forth driving mechanism 6. Backlash produced between the spline portion 3 and the grooves 4a of the fitting bore 5, and rattling produced between the channel 6 and the protruded strip 7 of the clutch 8. In addition, this failed to transmit accurately the rotating motion of a pinion, which is in a driving mechanism for driving the beam gear 4 provided on the weaving machine side, to the let-off warp beam 1. As a result, variation was caused in the tension of the warp fed from the let-off warp beam.

In view of the foregoing, it is an object of the present invention to provide a let-off warp beam coupling device which can accurately transmit a driving motion without any variation factors such as backlash and misalignment.

SUMMARY OF THE INVENTION

The let-off warp beam coupling device according to the present invention has a let-off warp beam rotatably and detachably mounted on a specified position of a weaving machine and a beam gear provided on the weaving machine so as to be opposite to a shaft end of a beam shaft of the let-off warp beam for rotating the let-off warp beam. The coupling device couples the beam gear to the beam shaft for driving it, and comprises a driven coupling member, and a driving coupling member. The driven coupling member is secured at the shaft end of the beam shaft of the let-off warp beam, and has a plurality of projections provided on a circle positioned on a plane perpendicular to the axial direction of the beam shaft. Each of the projections projects in the axial direction of the beam shaft and has a side face tapered in the axial direction. The driving coupling member is provided on the beam gear side so as to be opposite to the driven coupling member with a specified spacing therebetween, and has a plurality of projections provided on a circle positioned on a plane perpendicular to the axial direction of the beam shaft. Each of the projections projects in the axial direction of the beam shaft toward the driven coupling member and has a side face tapered in the axial direction. The projections are formed so that adjacent projections of one of the driven coupling member and the driving coupling member make each of the opposite projections of the other fitted therebetween without leaving any space. The device further comprises a holding member for holding an interengagement state in which adjacent projections of one of the driven coupling member and the driving coupling member are fitted between the opposite projections of the other coupling member without leaving any space therebetween. Moreover, each of the driven coupling member and the driving coupling member has the projections radially provided coaxially with respect to the direction of the beam shaft in equal intervals.

The let-off warp beam coupling device according to the present invention comprises the driving coupling member and driven coupling member both having projections radially formed coaxially with each other each having tapered sides mutually fitting with the other without any space between them. This allows a sure self-aligned coupling such coaxial that a connection is possible without any inexpedience such as misalignment, backlash and rattling in a coupled state.

DESCRIPTION OF THE PREFERRED EMBODIMENT

Figure 1:
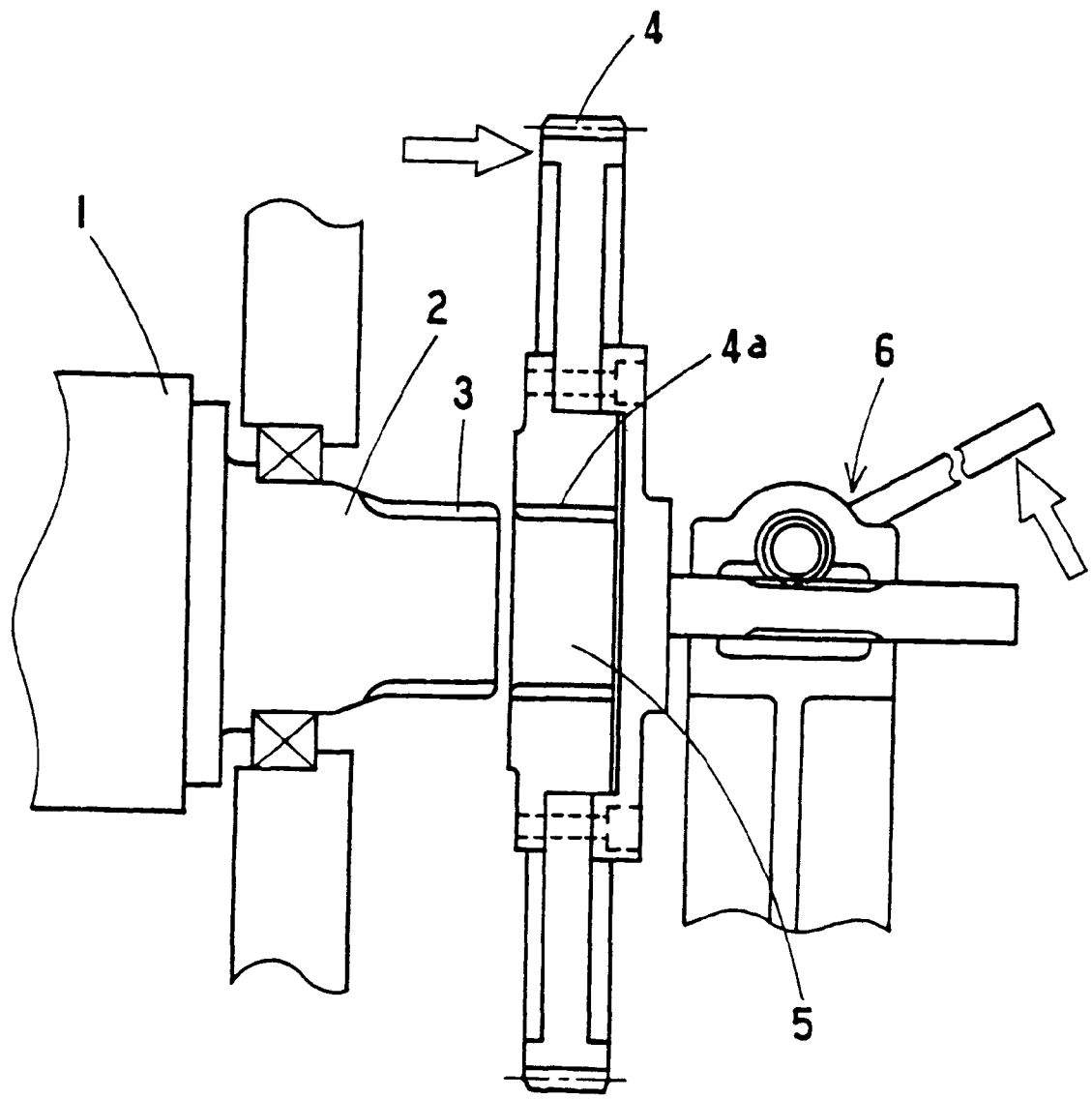
FIG. 1 is a partially vertical cross sectional side view showing a conventional let-off warp beam coupling device with a spline system before coupling.
Figure 2:
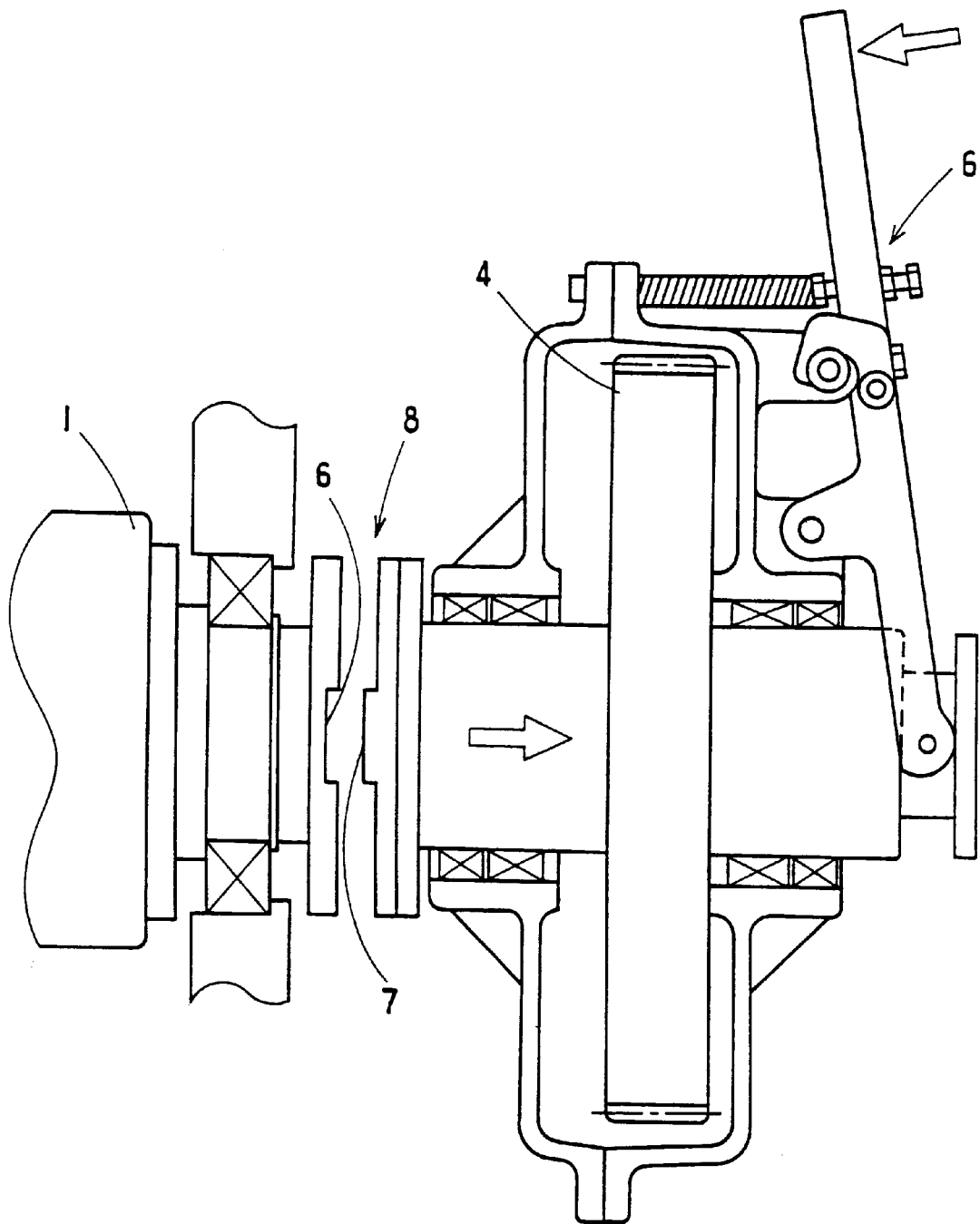
FIG. 2 is a partially vertical cross sectional side view showing another conventional let-off warp beam coupling device with a clutch system before coupling.
Figure 3:
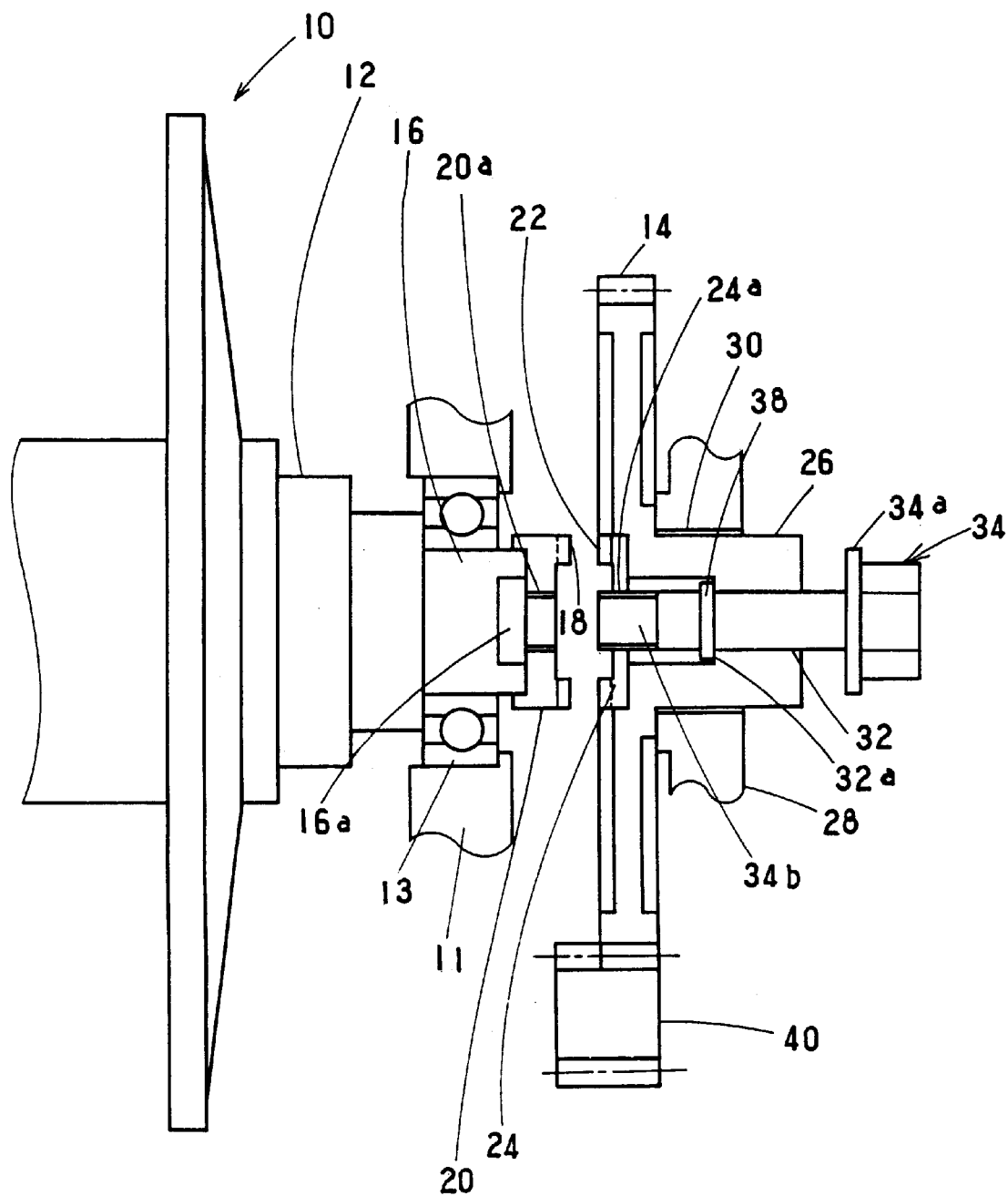
FIG. 3 is a partially vertical cross sectional side view showing an embodiment of a let-off warp beam coupling device according to the present invention before coupling.
Figure 4:
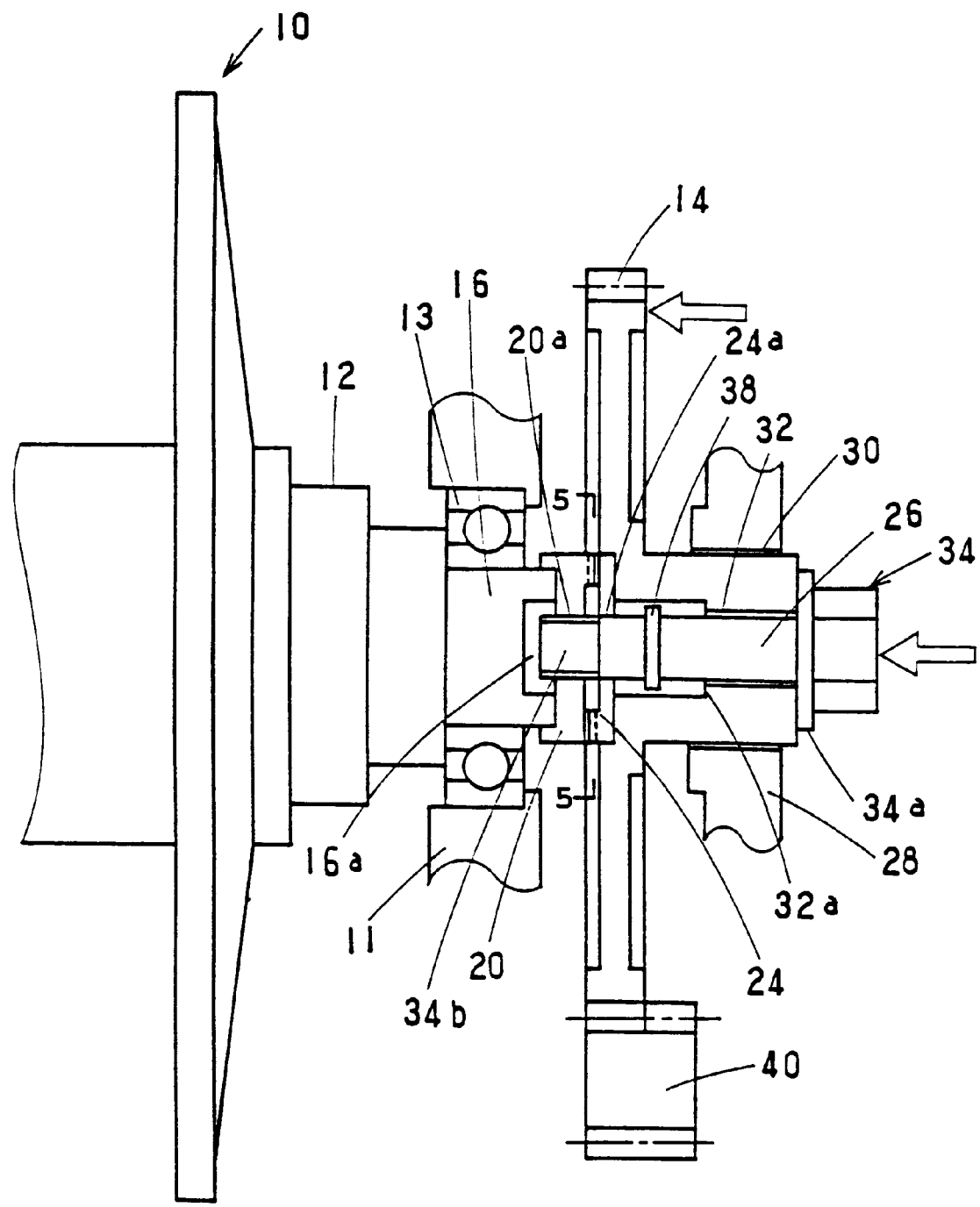
FIG. 4 is a partially vertical cross sectional side view showing the embodiment of the let-off warp beam coupling device according to the present invention shown in FIG. 3 after coupling.

A preferred embodiment of the present invention will be described on the basis of the drawings. The let-off warp beam coupling device in the embodiment is mounted on a specified position in an unillustrated weaving machine. The device is, as shown in FIG. 3 and FIG. 4, positioned between one end of a beam shaft 12 of a let-off warp beam 10, which is rotatable and detachable, and a beam gear 14 provided on the weaving machine side. The let-off warp beam 10 is detachably mounted on a bearing case 11 in the weaving machine through a bearing 13.

Figure 5:
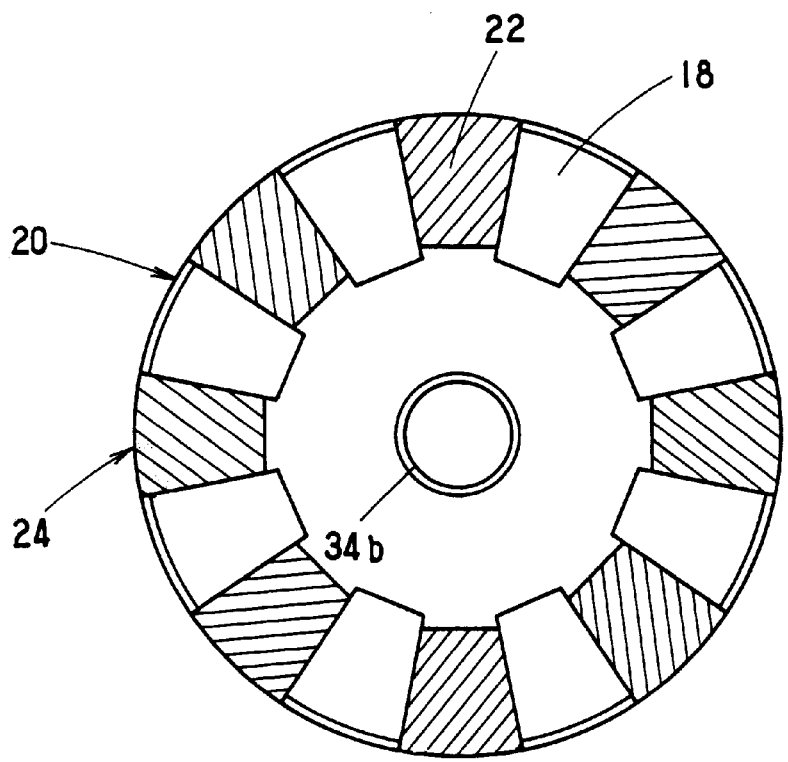
FIG. 5 is an enlarged cross sectional front view taken along line 5—5 of the let-off warp beam coupling device shown in FIG. 4.
Figure 6:
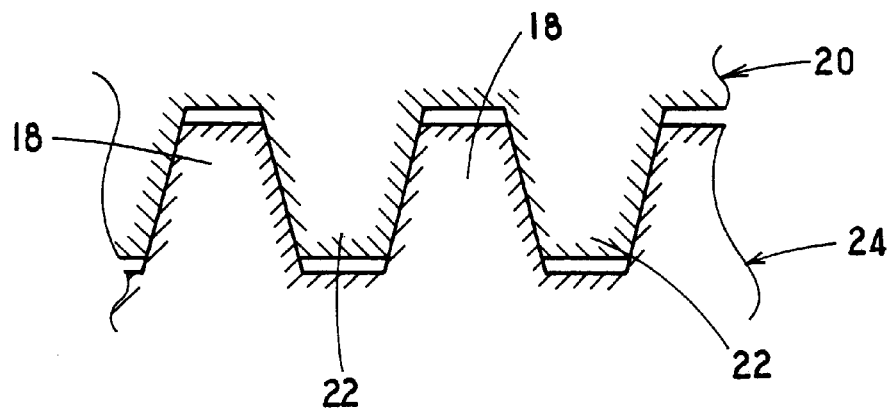
FIG. 6 is a partially enlarged cross sectional view showing an engaged part of a driven coupling member and a driving coupling member in the embodiment of the let-off warp beam coupling device according to the present invention.
Figure 7:
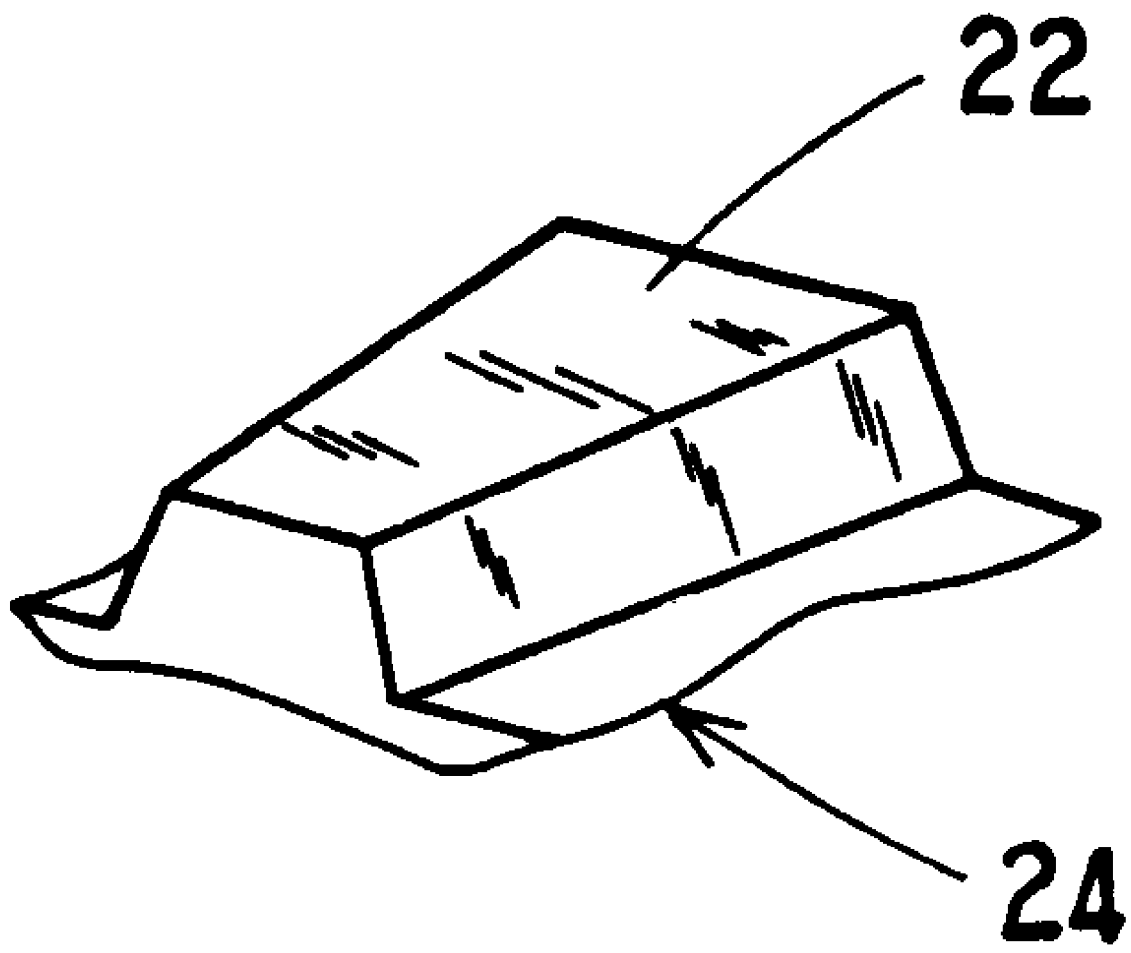
FIG. 7 is a partially perspective view showing a projection of a driving coupling member in the embodiment of the let-off warp beam coupling device according to the present invention.

A driven coupling member 20 is secured at one shaft-end 16 of the beam shaft 12 of the let-off warp beam 10. The driven coupling member 20 is provided with a plurality of projections 18 projecting in the axial direction of the beam shaft 12 as shown in FIG. 5 to FIG. 7. As shown in FIG. 5, the driven coupling member 20 is formed in doughnut-like and secured at the shaft-end 16 of the beam shaft 12 with unillustrated bolts or the like so as to be positioned in a plane perpendicular to the axial direction of the beam shaft 12. The projections 18 of the driven coupling member 20 are formed equally spaced on a circle perpendicular to the axial direction of the beam shaft 12. Each of the end faces of the projections 18 is formed in a trapezoid radially arranged in coaxial with respect to the axis of the beam shaft 12. The projection 18 is further formed tapered in the projecting direction with its side faces tapered.

At a position a specified distance apart from the driven coupling member 20, there is provided a driving coupling member 24. The driving coupling member 24 is provided with projections 22 having the same form as the projection 18. The projections 22 are mounted on the beam gear 14 so as to project toward the driven coupling member 20 in the axial direction of the beam shaft 12. The projections 22 of the driving coupling member 24 are also equally spaced on a circle perpendicular to the axial direction of the beam shaft 12. Each of the end faces of the projections 22 is formed in a trapezoid radially arranged in coaxial with respect to the axis of the beam shaft 12. The projection 22 is further formed with its side faces tapered in the projecting direction. The driving coupling member 24 is secured on the beam gear 14 with unillustrated bolts or the like.

The projections 18 of the driven coupling member 20 and the projections 22 of the driving member 24 are spaced at equal intervals. Thus, as shown in FIG. 5 and FIG. 6, it is possible to provide the adjacent projections 18 or 24 of the one coupling members make each of the opposite projections 22 or 18 of the other coupling member fitted therebetween without leaving any space. For the driven coupling member 20 and driving coupling member 24, a pair of curvic couplings of the same size can be used. Moreover, with the same constitution as the above, the numbers of the respective projections 18 and 22 may be adequately increased or reduced only with a plurality of numbers in a similar form as above.

The beam gear 14 has a coaxial gear boss 26 integrally formed together. The gear boss 26 is inserted in an insertion opening 30 of a holder 28 fixed on the weaving machine so that the gear boss 26 is allowed to freely move back and forth. The insertion opening 30 of the holder 28 has an inner diameter slightly larger than the outer diameter of the gear boss 26. This allows the gear boss 26 to rotate without being in touch with the insertion opening 30 with the driving coupling member 24, secured on the beam gear 14, being coupled to the driven coupling member 20 of the let-off warp beam 10. It is necessary only that the insertion opening 30 allows the gear boss 26 to be rotatably inserted therein. As described above, it is preferable that the gear boss 26 is not in touch with the insertion opening 30 in the state of being coupled with the driven coupling member 20 because no inexpedience such as friction is produced.

The gear boss 26 has a through hole 32 formed in coaxial with respect to the beam gear 14. Through the through hole 32 a bolt 34 is inserted as a holding member. The bolt 34 has a head 34a in a position allowed to be in contact with the end face of the gear boss 26, and an external thread portion 34b inserted in a through hole 24a at the center of the driving coupling member 24. The external thread portion 34b is provided so that it can be screwed in an internal thread 20a formed at the center of the driven coupling member 20. At the shaft-end 16 to which the driven coupling member 20 is secured, a recess 16a is formed for accommodating the top of the external thread portion 34b of the bolt 34. The beam gear 14 is engaged with a beam pinion 40 that is driven by an unillustrated driving means so as to drive the beam gear 14 at a specified rotating speed.

In the embodiment of the let-off warp beam coupling device, the let-off warp beam 10 is first secured to the bearing case 11. After this, the beam gear 14 is first manually slid on the beam pinion 40 toward the shaft-end 16 of the beam shaft 12 of the let-off warp beam 10 along the insertion opening 30 of the holder 28. Then, the projections 22 of the driving coupling member 24 are engaged with the projections 18 of the driven coupling member 20.

Following this, the external thread portion 34b of the bolt 34 is screwed into the internal thread 20a of the driven coupling member 20 to securely engage the projections 22 of the driving coupling member 24 with the projections 18 of the driven coupling member 20 to fasten them. In this interrengagement state, the driven coupling member 20 and the driving coupling member 24 are positioned coaxially by the engaged side faces of both of the projections 18 and 22 to be coupled each other. In this coupled state, the gear boss 26 of the beam gear 14 is not in contact with the inner face of the insertion opening 30 of the holder 28 of the weaving machine.

Next, when detaching the let-off warp beam 10 from the weaving machine for replacement, the bolt 34 is first unfastened to remove the external thread 34b from the internal thread 20a of the driven coupling member 20. Then, the beam gear 14 is manually moved in the direction away from the let-off warp beam 10. At this time, by pulling the bolt 34 in the direction away from the let-off warp beam 10, a collar 38 provided in the intermediate portion of the bolt 34 engages with a step 32a in the through hole 32 of the gear boss 26. This allows the beam gear 14 to move together with the bolt 34 in the direction away from the let-off warp beam 10.

In the let-off warp beam coupling device according to the embodiment, a plurality of the projections 18 and 22 are radially disposed in coaxial with respect to the axis of the beam shaft 12 at the coupled part of the driven coupling member 20 and driving coupling member 24. The projections 18 and 22, each provided with tapered sides, are coupled so as to be engaged with each other with the tapered sides to couple the driven coupling member 20 and driving coupling member 24 such that they are self-aligned with respect to the axis of the beam shaft 12. In addition, such engagement produces neither backlash nor rattling when driven to thereby allow the rotation of the beam gear 14 on the weaving machine side to be accurately transmitted to the let-off warp beam 10 without producing any rattling to permit the smooth rotation thereof with few variations.

The let-off warp beam coupling device according to the invention is not limited to the above embodiment such that the holding member may be, in addition to being a bolt, any mechanical or electromagnetic coupling mechanism.

Furthermore, the forward and backward movement of the beam gear 14 may be automatically provided by a fluid driven cylinder or a motor. In this case, only a reciprocating motion is necessary for a driving member such as a cylinder or a motor, for which a rotatable coupling joint may be better provided to couple the driving member to the rotating beam gear.

In the let-off warp beam coupling device according to the present invention, the driven coupling member and driving coupling member for coupling the let-off warp beam and beam gear are made self-aligned to each other, so that they can be securely coaxially coupled automatically. Furthermore, no backlash and rattling produced in the coupled part allow the let-off warp beam and beam gear to be securely coupled for being integrally driven. Consequently, an accurate driving motion can be transmitted from the driving device to the let-off warp beam.

While the present invention has been particularly shown and described with reference to the preferred embodiment thereof, it will understood by those skilled in the art that the foregoing and other changes in form and details can be made therein without departing from the spirit and scope of the invention.

FIG. 3
- 10 let-off warp beam
- 12 beam shaft
- 14 beam gear
- 16 shaft-end
- 20 driven coupling member
- 22 projection
- 24 driving coupling member
- 34 bolt

What is claimed is:

1. In a let-off warp beam coupling device having a let-off warp beam rotatably and detachably mounted on a specified position of a weaving machine and a beam gear provided on the weaving machine so as to be opposite to a shaft end of a beam shaft of the let-off warp beam for rotating the let-off warp beam, the coupling device coupling the beam shaft and the beam gear, the improvement comprising:

a driven coupling member secured at the shaft end of the beam shaft of the let-off warp beam, and having a plurality of projections provided on a circle positioned on a plane perpendicular to an axial direction of the beam shaft, each of the projections projecting in the axial direction of the beam shaft and having a side face tapered in the axial direction;

a driving coupling member provided on the beam gear side so as to be opposite to the driven coupling member with a specified spacing between the driving and driven coupling members, and the driving coupling member having a plurality of projections provided on a circle positioned on a plane perpendicular to the axial direction of the beam shaft, each of the projections of the driving coupling member projecting in the axial direction of the beam shaft toward the driven coupling member and having a side face tapered in the axial direction, the projections of the driven and driving coupling members being formed so that adjacent projections of one of the driven coupling member and the driving coupling member fit between the opposite projections of the other coupling member without leaving any space therebetween; and means for holding an interengagement state in which the adjacent projections of one of the driven coupling member and the driving coupling member are fitted between the opposite projections of the other coupling member without leaving any space between the fitted projections.

2. A let-off warp beam coupling device as claimed in claim 1, wherein each of the driven coupling member and the driving coupling member has the projections radially provided coaxially with the beam shaft, the projections of each respective coupling member being spaced from an adjacent projection by equal intervals.

\* \* \* \* \*